(12) United States Patent
Makljenovic et al.

(10) Patent No.: US 8,966,494 B2
(45) Date of Patent: Feb. 24, 2015

(54) APPARATUS AND METHOD FOR PROCESSING THREADS REQUIRING RESOURCES

(75) Inventors: Nebojsa Makljenovic, Cambridge (GB); Benjamin Charles James, Red Lodge (GB)

(73) Assignee: ARM Limited, Cambridge (GB)

( * ) Notice: Subject to any disclaimer, the term of this patent is extended or adjusted under 35 U.S.C. 154(b) by 317 days.

(21) Appl. No.: 13/421,886

(22) Filed: Mar. 16, 2012

(65) Prior Publication Data

US 2013/0247060 A1    Sep. 19, 2013

(51) Int. Cl.
*G06F 9/46*    (2006.01)
*G06F 9/52*    (2006.01)
*G06F 12/00*   (2006.01)

(52) U.S. Cl.
CPC ..................................... *G06F 9/526* (2013.01)
USPC ............................ 718/104; 718/102; 710/200

(58) Field of Classification Search
USPC .................. 711/151–152; 718/100, 102–104, 718/106–107; 709/104; 710/200; 719/328; 707/8, 704
See application file for complete search history.

(56) References Cited

U.S. PATENT DOCUMENTS

| | | | |
|---|---|---|---|
| 5,408,629 A * | 4/1995 | Tsuchiya et al. ............... | 711/151 |
| 6,338,063 B1 * | 1/2002 | Barr .............................. | 707/704 |
| 6,738,974 B1 * | 5/2004 | Nageswaran et al. .......... | 718/104 |
| 6,973,521 B1 * | 12/2005 | Indiresan et al. .............. | 710/200 |
| 7,188,344 B1 * | 3/2007 | Blue .............................. | 718/106 |
| 7,328,293 B2 * | 2/2008 | Hammarlund et al. ........ | 710/200 |
| 8,726,279 B2 * | 5/2014 | Avkarogullari et al. ....... | 718/100 |
| 2002/0107854 A1 * | 8/2002 | Hua et al. .......................... | 707/8 |
| 2003/0105796 A1 * | 6/2003 | Sandri et al. ................... | 709/104 |
| 2006/0218556 A1 * | 9/2006 | Nemirovsky et al. .......... | 718/104 |
| 2006/0225077 A1 * | 10/2006 | Anderson ....................... | 718/104 |
| 2006/0230411 A1 * | 10/2006 | Richter et al. ................. | 719/328 |
| 2007/0124545 A1 * | 5/2007 | Blanchard et al. ............. | 711/152 |
| 2008/0256547 A1 * | 10/2008 | Brahmavar ..................... | 718/104 |
| 2010/0031265 A1 * | 2/2010 | Koning et al. ................. | 718/104 |
| 2010/0242043 A1 * | 9/2010 | Shorb ............................. | 718/104 |
| 2010/0257534 A1 * | 10/2010 | Cismas et al. ................. | 718/103 |
| 2010/0275209 A1 * | 10/2010 | Detlefs .......................... | 718/102 |
| 2011/0161539 A1 * | 6/2011 | Anand et al. ................... | 710/200 |
| 2011/0289507 A1 * | 11/2011 | Khan et al. ..................... | 718/104 |
| 2012/0311606 A1 * | 12/2012 | Marathe et al. ................ | 718/107 |

OTHER PUBLICATIONS

Kirk, David, B. "NVIDIA CUDA Software and GPU Parallel Computing Architecture", 2007, ISMM.*

* cited by examiner

*Primary Examiner* — Lewis A Bullock, Jr.
*Assistant Examiner* — Gilles Kepnang
(74) *Attorney, Agent, or Firm* — Nixon & Vanderhye P.C.

(57) ABSTRACT

A data processing apparatus has processing circuitry for processing threads using resources accessible to the processing circuitry. Thread handling circuitry handles pending threads which are waiting for resources required for processing. When a request is made for a resource which is not available, a lock is set to ensure that once the resource becomes available, the resource remains available until the lock is removed. This prevents other threads reallocating the resource. When a subsequent pending thread requests access to the same locked unavailable resource, the lock is transferred to that subsequent thread so that the latest thread accessing that resource is considered the lock owning thread. The lock is removed once the lock owning thread is ready for processing.

20 Claims, 4 Drawing Sheets

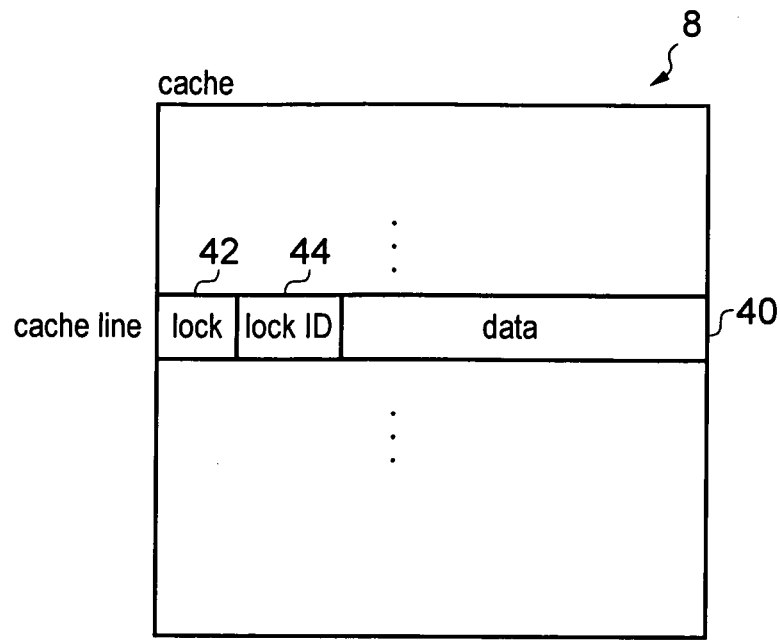

FIG. 2

| no lock set for requested resource | | lock set for requested resource | | | |
|---|---|---|---|---|---|
| requested resource available | requested resource not available | requested resource available | | requested resource not available | |
| forward current thread to processor | send current thread to replay buffer, set lock for requested resource, set current thread as lock owning thread, initiate process of resource acquisition | current thread = lock owning thread | current thread ≠ lock owning thread | current thread = lock owning thread | current thread ≠ lock owning thread |
| | | forward current thread to processor, remove lock | forward current thread to processor, retain lock | send current thread to replay buffer, retain lock | send current thread to replay buffer, retain lock, set current thread as lock owning thread |

FIG. 3

| Cycle | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| replay 0 | Ax | Bx | Cx | Dy | Ex | Ax | Bx | Cx | Dy | Fy | Gx | Hy | Iz | Dy | Jz | |
| replay 1 | - | Ax | Bx | Cx | Dy | Ex | Ax | Bx | Cx | Dy | Fy | Gx | Hy | Iz | Dy | Jz |
| replay 2 | - | - | Ax | Bx | Cx | Dy | Ex | Ax | Bx | Cx | Dy | Fy | Gx | Hy | Iz | Dy |
| replay 3 | - | - | - | Ax | Bx | Cx | Dy | Ex | Ax | Bx | Cx | Dy | Fy | Gx | Hy | Iz |
| replay 4 | - | - | - | - | Ax | Bx | Cx | Dy | Ex | Ax | Bx | Cx | Dy | Fy | Gx | Hy |
| lock owning thread for x | A | B | C | C | E | A | B | C | C | C | G | G | G | G | G | - |
| thread passed to processor | - | - | - | - | - | - | - | - | - | Ex | Ax | Bx | Cx | - | - | Gx |

FIG. 4

APPARATUS AND METHOD FOR PROCESSING THREADS REQUIRING RESOURCES

FIELD OF THE INVENTION

The present invention relates to the field of data processing. In particular, the invention relates to the handling of processing threads which are awaiting resources required for processing.

BACKGROUND TO THE INVENTION

A processing circuit may perform processing operations in units called processing threads. Each processing thread represents a different task to be performed by the processing circuit. For example, a graphics processor may execute a number of processing threads, with each thread corresponding to a particular pixel or group of pixels of an image being processed by the graphics processor.

A processing thread may require resources to be available to the processing circuit before the thread can be executed. For example, the processing circuit may require access to data in a memory or cache, or may require bandwidth to be allocated on a particular piece of hardware in order to execute the thread. Therefore, a thread may request a required resource and then wait for the required resource to become available before it can be processed by the processing circuit.

One problem can arise in such a system when a first thread requests access to a given resource and, before the first thread can use the requested resource, a second thread also requests a resource and this request causes reallocation of the resource requested by the first thread. For example, the first thread may request that data is placed in a cache line of a cache, but before the thread is able to use the data, the second thread may evict the data and reallocate the cache line for its own required data. If the first thread now again requests the required data, this can lead to a problem called thrashing where the first and second threads alternately request the data and each thread's request prevents the other thread from using the required resource, stopping either thread from being processed. The present technique seeks to reduce the amount of reallocation of resources that occurs when processing the threads, so as to reduce the likelihood of thrashing.

SUMMARY OF THE INVENTION

Viewed from one aspect, the invention provides a data processing apparatus comprising:
processing circuitry configured to process processing threads using resources accessible to said processing circuitry;
thread handling circuitry configured to handle pending threads awaiting resources required for processing; and
resource checking circuitry configured to check whether at least one resource required by a pending thread from said thread handling circuitry is available, to forward said pending thread to said processing circuitry for processing if said at least one resource is available, and to request access to said at least one resource and retain said pending thread in said thread handling circuitry if said at least one resource is not available; wherein:
said resource checking circuitry is configured to set a lock for an unavailable resource if said unavailable resource is requested for a pending thread and said unavailable resource is not already locked, and to set the pending thread for which the unavailable resource is requested as a lock owning thread for said unavailable resource, wherein a locked resource which becomes available remains available until the lock associated with the locked resource is removed;
on determining that a locked resource is unavailable for a subsequent pending thread which requires said locked resource and is not the current lock owning thread for said locked resource, said resource checking circuitry is configured to set said subsequent pending thread as the lock owning thread for said locked resource; and
said resource checking circuitry is configured to remove the lock associated with an available locked resource if the current lock owning thread for said available locked resource is forwarded to said processing circuitry for processing.

Processing threads are retained by thread handling circuitry until resources required for the threads become available. The present technique provides resource checking circuitry for checking whether the resources required by a particular thread are available. The resource checking circuit can set a lock for an unavailable resource which is requested for a pending thread. The lock ensures that once the locked resource becomes available, the locked resource remains available until the lock has been removed from the resource. Hence, the lock prevents other threads causing reallocation of the locked resource. This prevents the thrashing problem.

However, there may be several pending threads which each require access to the same resource. If the lock is removed after one thread has used the locked resource, then this could cause reallocation of the resource before another thread can use that resource. Therefore, the lock placed on the resource can be used more efficiently by sharing the lock between multiple different pending threads which require the same resource.

The present technique uses the concept of "lock ownership" to identify whether there are other threads which require access to locked data. The resource checking circuitry sets as a lock owning thread the thread which caused the lock to be set. The resource checking circuitry then transfers the lock ownership from pending thread to pending thread so that the lock ownership resides with the last pending thread accessing the locked resource. Each time a subsequent thread is encountered which requires access to a locked unavailable resource, the lock ownership of the lock is transferred to that subsequent pending thread. The lock is removed when the current lock owning thread for the locked resource is forwarded to the processing circuitry for processing. In this way, the lifetime of the lock can be extended, since the lock remains active as long as there is at least one pending thread remaining in the thread handling circuitry which requires the locked resource. This reduces the amount of reallocation of resources required for processing the pending threads, thus improving processing performance.

If a pending thread which requires the locked resource and which is not the current lock owning thread for that resource is forwarded for processing, then the lock remains and is not removed. This is because there is at least one other thread (the lock owning thread) remaining in the thread handling circuitry which requires the same resource, and so that thread can continue to enjoy the benefit of the lock which protects the locked resource from potential reallocation by other threads.

There are various ways of identifying which thread is the current lock owning thread. For example, the resource checking circuitry may maintain lock identifying data.

However, in one example, the locked resource is associated with a lock identifier identifying the current lock owning thread for the locked resource. When the resource checking circuitry encounters another thread which requires access to the locked unavailable resource and which is not the lock owning thread, then the resource checking circuitry updates the lock identifier of the locked resource to identify the subsequent pending thread as the lock owning thread. When a thread leaves the thread handling circuitry for processing, the resource checking circuitry checks the lock identifier to determine whether or not the lock should be removed.

The lock identifier may comprise an arbitrary identifier allocated by the resource checking circuitry to distinguish different threads. However, in some systems, each thread may already have a thread identifier identifying the threads, and so the lock identifier may simply comprise the thread identifier of the current lock owning thread.

The resource checking circuitry may prevent the available locked resource from becoming unavailable until the lock associated with the locked resource is removed. Alternatively, another unit such as a processing unit, cache or memory may be responsible for preventing the reallocation of the locked resource, and the resource checking circuitry may simply provide that unit with an indication of whether a resource should be locked or unlocked.

The thread handling circuitry may have different forms. In one example, the thread handling circuitry may comprise a pipeline for performing pre-processing operations on the pending threads. For example, the pre-processing operations may include determining which resources are required for the pending threads, for example by determining the addresses of the required resources. Also, the pre-processing operations may include determining sideband information, which can speed up processing since by determining some information in advance, less processing is required at the processing circuitry.

The resource checking circuitry may check whether at least one resource is available for a pending thread output from the pipeline, and if the resource is not available, may return the pending thread to the start of the pipeline. Hence, threads can loop round the pipeline until the relevant resources are available, at which point the threads can be forwarded onto the processing circuitry. Threads may also be sent through the pipeline for another pass if multiple passes through the pipeline are required for the pre-processing operations. For example, in some graphics processes, there may be multiple graphics layers which require rendering and some pixels may need to be re-processed for each layer. Hence, the resource checking circuitry can also be used to control multiple passes of a pending thread through the pipeline.

Another example of the thread handling circuitry may be a thread buffer for buffering pending threads waiting for resources to become available. For example, the thread buffer may not perform any processing as such but may simply be a storage buffer for storing those threads which have been pre-processed by the pipeline but are still awaiting resources before they can be processed.

In one embodiment, the thread buffer may comprise a "first-in first-out" (FIFO) buffer which, in each processing cycle, outputs the processing thread which was least recently input to the FIFO buffer. The resource checking circuitry may check whether the required resource has become available for the pending thread output from the FIFO buffer, and if the required resource is not available, may input the thread back into the FIFO buffer. Hence, the threads may cycle through the FIFO buffer and each time a thread returns to the head of the FIFO buffer, the resource checking circuitry may check whether the required resources are available.

While some apparatuses may comprise only one of the processing pipeline and the FIFO buffer, it may be advantageous to provide both. The pipeline can then perform some pre-processing operations and when the pre-processing operations are complete, the thread buffer can be used to store the threads until the required resources are available. The thread buffer enables more efficient processing because threads which have completed pre-processing, but are still awaiting resources, can exit the pipeline to make way for newer threads.

The resources required by the processing threads may have various forms. Examples include bandwidth on a bus network or interconnect, or a processing slot on a hardware unit such as a processor, co-processor or configurable processor such as a field programmable gate array (FPGA). The present technique may be particularly useful for controlling access to a configurable processor such as a FPGA, because configuration of the FPGA may take some time, but once the FPGA has been configured then multiple threads may use the configured processor. Hence, a lock may be placed on the configurable processor when one thread requests a particular FPGA configuration, and this lock can prevent reconfiguration of the FPGA by other threads. Any subsequent threads which require the same configuration as the initial thread may also enjoy the protection provided by the lock, and so passing the lock ownership from thread to thread helps to extend the lifetime of the lock and improve the throughput of threads that require the current configuration of the FPGA.

However, a particularly useful application of the present technique is where the resources comprise data or instructions required for processing the pending threads. Unless otherwise specified, the term "data" in the present application should be interpreted as including instructions.

For example, the apparatus may comprise a memory which stores the data and a cache for caching a portion of the data stored in the memory. The cache may comprise a plurality of cache storage locations, and when access is requested to data which is not already stored in the cache, a line fill request may be issued to memory to request that the data is stored in the cache. When a cache storage location is allocated for storing the requested data, then a lock may be placed on the cache storage location to indicate that the cache storage location cannot be reallocated for storing other data until the lock has been removed (if the storage location was not locked, then the storage location could be reallocated, either before the data has been retrieved from the memory or after the data has become available but the thread has not used the data yet). The lock may be passed from thread to thread to ensure that the lock remains as long as there is still a thread requiring access to the cache line of data. This reduces the amount of cache line eviction and thrashing and improves throughput of threads.

When checking the availability of data for a pending thread, the resource checking circuitry may determine whether data required by the thread is present in the cache, and if not, may issue a request to fetch the data from memory and store the data to a cache storage location. The resource checking circuitry may also set a lock for that storage location at this stage.

If all the cache storage locations of the cache are already allocated for storing data, then the resource checking circuitry may reallocate a cache storage location for which no lock has been set for storing the required data. Hence, data which is not locked can be evicted because there are no pending threads waiting for access to that data. The cache storage location from which the data has been evicted can then be reused for the requested data.

On the other hand, if all the locations of the cache are already locked, then it is not possible to evict any data and so the resource checking circuitry may simply return the pending thread to the thread handling circuitry without issuing any request for data to the memory.

The cache storage locations may be individually locked or unlocked. However, it is more common for a group of cache storage locations to be locked and unlocked together, for example in units of a cache line or a block of cache storage locations.

The processing circuitry may comprise a graphics processor. The present technique is particularly useful for such a system because graphics processing tends to involve the processing of a large number of different threads representing different areas of a graphics image. The resources may include texture data and the processing threads may comprise texture mapping threads for controlling the graphics processor to perform texture mapping operations using the texture data.

Viewed from another aspect, the present invention provides a data processing apparatus comprising:

processing means for processing processing threads using resources accessible to said processing circuitry;

thread handling means for handling pending threads awaiting resources required for processing; and resource checking means for checking whether at least one resource required by a pending thread from said thread handling circuitry is available, for forwarding said pending thread to said processing means for processing if said at least one resource is available, and for requesting access to said at least one resource and retaining said pending thread in said thread handling means if said at least one resource is not available; wherein:

said resource checking means is configured to set a lock for an unavailable resource if said unavailable resource is requested for a pending thread and said unavailable resource is not already locked, and to set the pending thread for which the unavailable resource is requested as a lock owning thread for said unavailable resource, wherein a locked resource which becomes available remains available until the lock associated with the locked resource is removed;

on determining that a locked resource is unavailable for a subsequent pending thread which requires said locked resource and is not the current lock owning thread for said locked resource, said resource checking means is configured to set said subsequent pending thread as the lock owning thread for said locked resource; and said resource checking means is configured to remove the lock associated with an available locked resource if the current lock owning thread for said available locked resource is forwarded to said processing means for processing.

Viewed from a further aspect, the present invention provides a method of processing data using a data processing apparatus comprising processing circuitry configured to process processing threads using resources accessible to said processing circuitry, and thread handling circuitry configured to handle pending threads awaiting resources required for processing;

said method comprising steps of:

(a) checking whether at least one resource required by a pending thread from said thread handling circuitry is available;

(b) if said at least one resource is available, then forwarding said pending thread to said processing circuitry for processing;

(c) if said at least one resource is not available, then:

(i) requesting access to said at least one resource for said pending thread and retaining said pending thread in said thread handling circuitry; and (ii) setting a lock for said at least one resource and setting the pending thread for which said at least one resource is requested as a lock owning thread for said at least one resource, (d) checking whether a locked resource required by a subsequent pending thread from said thread handling circuitry is available, wherein a locked resource which becomes available remains available until the lock associated with the locked resource is removed;

(e) if said locked resource is unavailable and said subsequent pending thread is not the current lock owning thread for said locked resource, setting said subsequent pending thread as the lock owning thread for said locked resource; and (f) if said locked resource is available and said subsequent pending thread is the current lock owning thread for said locked resource, forwarding said subsequent pending thread to said processing circuitry for processing and removing the lock associated with said locked resource.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 schematically illustrates an example of how cache lines can be locked to prevent reallocation;

FIG. 3 is a table illustrating an example of the way in which a lock for a locked resource may be controlled by request checking circuitry;

FIG. 4 illustrates an example of transferring lock ownership between pending threads in a replay buffer.

DESCRIPTION OF THE EMBODIMENTS

Figure 1:
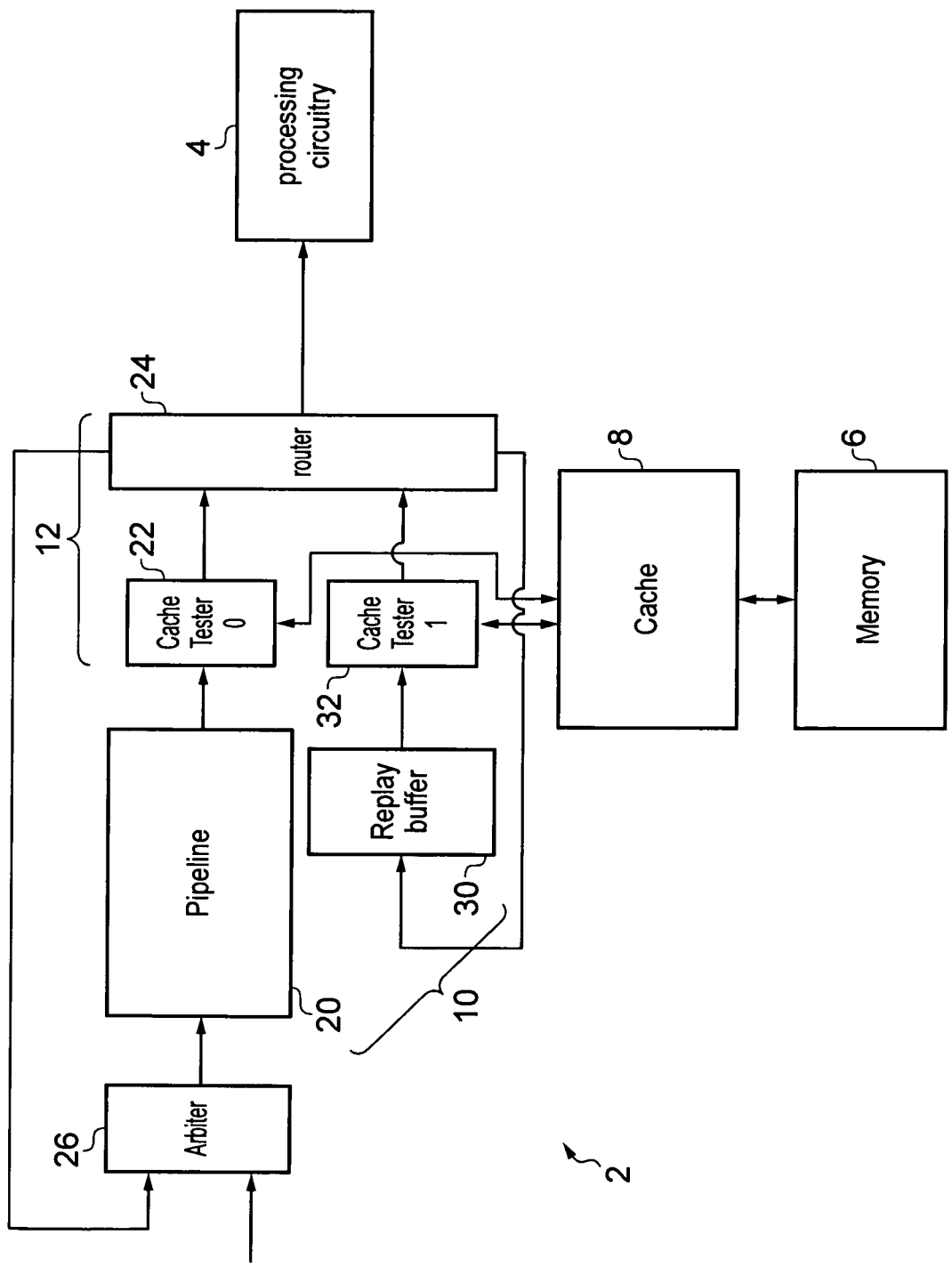
FIG. 1 schematically illustrates a data processing apparatus comprising processing circuitry and thread handling circuitry for handling pending threads which are awaiting resources required for processing.

FIG. 1 schematically illustrates a data processing apparatus 2 comprising processing circuitry 4 for processing processing threads. For example, the processing circuitry 4 may be a graphics processor and the threads may be texture threads each corresponding to a pixel or a group of pixels of an image being rendered by the processing circuitry 4. The apparatus 2 has a memory 6 for storing data used by the processing circuitry 4. The data may include instructions to be executed by the processing circuitry 4 or data, such as texture data defining how texturing operations controlled are to be performed. The apparatus 2 also has a cache 8 for storing a portion of the data of the memory 6. The cache 8 enables quicker access to a subset of the data stored in memory 6.

The apparatus 2 also comprises thread handling circuitry 10 for handling pending threads which are awaiting processing by the processing circuitry 4. A pending thread may require access to one or more resources in order to be processed. For example, a thread may need data to be available in the cache 8 before it can be processed by the processing circuitry 4. Resource checking circuitry 12 checks whether the required resources are available for each pending thread. If the required resources are available, then the request checking circuitry 12 sends the thread to the processing circuitry 4 for processing. On the other hand, if at least one required resource is not yet available, then the thread is returned to the thread handling circuitry 10 to wait for the resource to become available.

The thread handling circuitry 10 includes a pre-processing pipeline 20 which performs pre-processing operations on the thread. The pipeline 20 may have a number of pipeline stages, with each pipeline stage performing a given pre-processing operation on the threads passing through that stage. For example, the pre-processing operations may include determining addresses of data required from memory 6 for that thread, and/or determining sideband information which can be used to reduce the amount of processing required at the processing circuitry 4.

A first cache tester 22 of the resource checking circuitry 12 checks whether the data required by the thread in the final pipeline stage of the pipeline 20 is available in the cache 8. If the data is available, then the thread is forwarded to the processing circuitry 4 via a router 24. If not, then either the thread may be returned to the start of pipeline 20 via router 24 and arbiter 26, or the router 24 may route the thread to a replay buffer 30 of the thread handling circuitry 10.

The arbiter 26 controls inputting of threads to the pipeline 20, and arbitrates between threads returned from the router 24 which have already passed through the pipeline 20 at least once, and threads which are being input to the pipeline 20 for the first time. The arbiter 26 may preferentially select threads returned from the router 24 over new threads to ensure that a new thread can only enter the pipeline 20 in a cycle when there is no older thread awaiting re-entry into the pipeline 26.

The replay buffer 30 is a buffer for storing threads which have been pre-processed by the pipeline 10 but which are still awaiting resources, such as data in the cache 8. The replay buffer 30 is a FIFO buffer which, in each processing cycle, outputs the thread which was least recently input to the FIFO buffer. A second cache tester 32 determines whether the pending thread output from the FIFO replay buffer 30 has its required resource(s) available. If so, then the thread is forwarded to the processing circuitry 4. If not, then the thread is input back into the replay buffer 30 where the thread will go to the back of the queue. In this way, threads whose resources are not available continue to cycle through the replay buffer 30, and the availability of the required resources is checked by the cache tester 32 each time the thread returns to the head of the FIFO buffer, until the resources become available.

FIG. 2 shows an example of the storage locations of the cache 8. The cache includes a number of cache lines 40 which may each store data requested by a pending thread. Each cache line 40 is associated with a lock field 42 which specifies whether the cache line is locked or not and a lock identifier field 44 which identifies the pending thread which is the current owner of the lock. When a cache line is locked, then the cache 8 prevents reallocation of the cache line for storing other data, and any data placed in the locked cache line will not be evicted from the cache 8 until the lock is removed.

The lock identifier 44 is used by the resource checking circuitry 12 to identify when to remove the lock. The lock identifier 44 identifies the latest thread to have requested access to the data in the locked cache line 40. For example, each thread may have a thread identifier and the lock identifier may correspond to the thread identifier of the current lock owning thread.

If a thread which requires the data stored in the locked cache line but which is not the current lock owning thread identified by the lock identifier 44 exits the thread handling circuitry 10 for processing by the processing circuitry 4, then the resource checking circuitry 12 does not remove the lock. On the other hand, when the thread identified by the lock identifier 44 of the cache line 40 exits the thread handling circuitry 10 for processing, then the lock is removed. In this way, the resource checking circuitry 12 ensures that the lock remains in place as long as there is a pending thread in either the pipeline 20 or the replay buffer 30 which still requires the data in the locks cache line 40.

FIG. 3 shows a table explaining the way in which the resource checking circuitry 12 handles a thread which requires access to a particular resource. Both the cache tester 22 and cache tester 32 may operate in substantially a similar way, so FIG. 3 applies to both cache testers. The action taken by the cache testers 22,32 depends on whether a lock has been set for the requested resource, whether the requested resource is available, and whether the current thread is the lock owning thread or not.

As shown in FIG. 3:
- If no lock has been set for the resource required by the pending thread, and the requested resource is available, then the thread is ready for processing and so the resource checking circuitry 12 forwards the current thread to the processing circuitry 4.
- If no lock has been set for the required resource, and the resource is not available, then the checking circuitry 12 sends the current thread to the replay buffer 30 (or alternatively to pipeline 20, for example if there is no space available in the replay buffer 30). The resource checking circuitry 12 initiates a process for requesting access to the required resource, by reserving a cache line 40 in the cache 8 and issuing a linefill request to memory 6 for the required data. The resource checking circuitry 12 also sets a lock for the requested resource, by setting the lock field 42 to a value (e.g. a bit value of 1) indicating that the cache line is locked. Also, the lock identifier 44 of the cache line is set to an identifier identifying the current thread as the current lock owning thread.
- If a lock has been set for the resource requested by the current thread, the requested resource is available and the current thread is the lock owning thread for that resource, then the resource checking circuitry 12 forwards the current thread to the processor and removes the lock from the locked resource by setting the lock field 42 to a value (e.g. a bit value of 0) indicating that the cache line 40 is not locked. Since the current thread is the lock owning thread, this indicates that there are no other pending threads in the thread handling circuitry 10 which require the same resource and so the lock is no longer required. Removing the lock enables other threads to allocate data to the cache line 40.
- If a lock has been set for the requested resource, the requested resource is available and the current thread is not the lock owning thread identified by the lock identifier 44, then the thread is forwarded to the processor 4 for processing. However, the lock is retained because there is at least one other thread (the lock owning thread) remaining in the thread handling circuitry 10 which still requires the same data.
- If the lock has been set for the requested resource, the resource is not yet available, and the current thread is the lock owning thread, then the current thread is returned to the thread handling circuitry 10 and the lock is retained (or alternatively the lock identifier 44 can be updated to identify the current thread as the lock owner, although this will not change the identifier value since the thread is already the lock owner).
- If the lock has been set for the requested resource, the requested resource is not available and the current thread is not the lock owning thread, then the current thread is retained in the thread handling circuitry 10, and the lock ownership is transferred to the current thread by updating the lock identifier field 44 of the locked cache line 40 to specify the current thread as the lock owning thread.

By controlling the lock this way, the lock ownership will reside with the last thread in the replay buffer 30 or pipeline 10 which requires access to the locked resource, and the lock will remain in place until the last thread which accesses the resource leaves the thread handling circuitry 10 for processing. Therefore, the lifetime of the lock can be extended to cover all the pending threads which require that resource.

In systems in which the thread handling circuitry 10 processes the threads in order and cannot reorder the sequence of threads, the present technique will guarantee that the lock ownership will reside with the very last thread in the thread handling circuitry 10 that requires that resource. However, the present technique may also be useful if some re-ordering of threads within the thread handling circuitry 10 is allowed. For example, the pipeline 20 may have multiple sub-loops within the pipeline, and threads passing through different sub-loops may be re-ordered with respect to one another. Applying the present technique to such a pipeline 20 may not guarantee that the lock ownership will transfer to the very last thread, since that thread could be handled out of turn with respect to other threads. Nevertheless, the present technique will still be useful because the technique will still extend the lifetime of a lock to some extent, even though there may be a few threads which still require access the resource after the lock has been removed.

FIG. 4 shows an example of applying the present technique to the replay buffer 30. It will be appreciated that a similar technique can be used with the pipeline 20. FIG. 4 shows a simple case where the replay buffer 30 has storage capacity for storing five pending threads, but in most practical implementations the replay buffer 30 may store many more threads, for example 32 or 48.

In each processing cycle, a thread whose required resource has been found to be unavailable by the cache tester 22 or 32 is input to the replay buffer 30. In FIG. 4, each thread is indicated by a notation "Ax", where the capital letter indicates the thread identifier of the thread and the lower case letter indicates the resource required by that thread. While FIG. 4 illustrates a simple case where each thread only requires one resource, the same technique can be applied where multiple resources are required by some threads (in this case, all required resources would need to become available before the thread can be processed, and locks may be set independently for each resource).

In cycle 0, thread A is input to the replay buffer. Thread A requires access to resource x. Meanwhile, during cycle 0 cache tester 22 finds that a thread B also requires access to resource x and resource x is unavailable, and so in the following cycle 1 thread B is also input to the replay buffer. Similarly, in cycles 2 to 4 of FIG. 4, threads C, D and E are input to the replay buffer 30, with threads C and E requiring access to resource x and thread D requiring access to resource y. The resources x and y are not ready yet and so in cycles 4 to 8 the threads A to E cycle round the replay buffer 30. Each time a thread reaches the final stage of the replay buffer 30, the cache tester 32 determines that its required resource x or y is not ready yet and so inputs the thread into the first stage of the replay buffer 30 in the following cycle.

FIG. 4 also shows, for each cycle, which thread is the lock owning thread for resource x. In the cycle preceding cycle 0, thread A was determined by the cache tester 22 to require access to an unavailable resource x. Therefore, resource x was requested and a lock was set for resource x, with thread A as the lock owning thread. Hence, in cycle 0 thread A is the lock owning thread.

In cycle 0, the cache tester 22 determines that thread B also requires access to the locked resource x. As thread B is not the lock owning thread A, and the resource is still unavailable, then thread B takes over the lock ownership for the following cycle (cycle 1). In subsequent cycles, each time a different thread requires access to the unavailable locked resource x, that thread takes over the lock ownership for the following processing cycle. Therefore, the lock ownership passes between threads B, C, E and A in cycles 1 to 7 of FIG. 4. Note that in each cycle, the lock owning thread is the thread that accesses resource x and was input into the replay buffer 30 most recently (in this example, the thread in the replay stage with the lowest number). It will be appreciated that a similar locking scheme may be used for resource y, but this has not been illustrated in FIG. 4 for conciseness.

Eventually, the resource x becomes available during cycle 8. For example, the required data may have been fetched from memory and loaded into the locked cache line. Since the lock is in place, this data cannot be evicted and the cache line cannot be reallocated by another thread until the lock is removed. In cycle 8, the cache tester 32 determines that the resource x required by the thread E in the final replay stage of the replay buffer 30 is available, and so in the following cycle 9 the thread E is forwarded to the processing circuitry 4 for processing. Since thread E is not the current lock owner (thread C is the current lock owning thread in cycle 8), the lock remains in place despite thread E exiting the pipeline. The lock remains in place until the lock owner itself exits the pipeline. In the example of FIG. 4, in cycle 10 another thread G requesting access to resource x is input and so thread G takes over the lock ownership. In cycles 10 to 12 threads A, B, C are output as their required resource x is now available, and as these threads are not the lock owning thread G, the lock is retained. Finally, at cycle 14 the resource x is determined to be available for the lock owning thread G, and so in the following cycle the lock owning thread G is forwarded for processing, and the lock associated with resource x is removed.

If the lock ownership had not been passed from thread to thread in the way shown in FIG. 4, then thread A (the thread which originally caused the lock to be set for resource x) would remain as the lock owner, and so the lock would be removed when the thread A leaves the pipeline after cycle 9. If this was the case, then when thread D requests access the resource y in cycle 12, it is possible that thread D could cause the resource x to be reallocated, so that the resource x is no longer available in cycle 14 for thread G. This can cause thrashing, if thread D and thread G alternately request access to different resources and each thread's request causes the other thread's resource to be reallocated before it can be used by the other thread.

This problem is prevented by passing the thread ownership from thread to thread each time the resource checking circuitry encounters another thread requiring access to the locked resource. By ensuring that the lock ownership resides with the last thread in the replay buffer 30 which requires access to the locked resource, and removing the lock when the lock owning thread leaves the replay buffer 30, the lifetime of the lock is extended beyond the lifetime of the initial thread which requires access to the locked resource. This ensures that the locked resource will remain available until there are no more threads requiring access to the same resource, reducing the likelihood of thrashing. The technique also reduces the amount of reallocation of resources required and so reduces the average waiting time for threads and improves processing performance.

Figure 5:
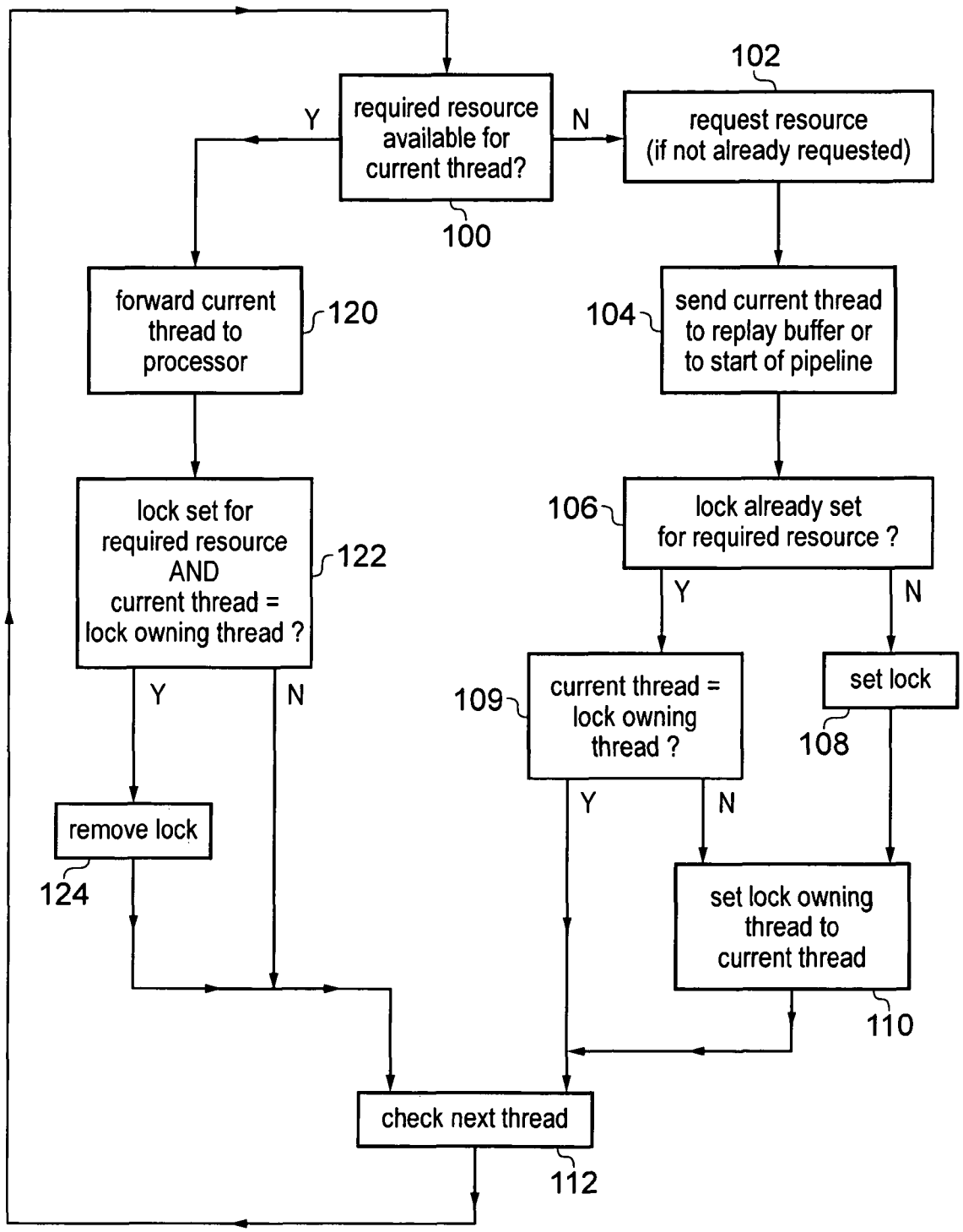
FIG. 5 illustrates a method of handling pending threads.

FIG. 5 illustrates a method of handling processing threads according to the present technique. At step 100, the resource checking circuitry 12 checks whether a required resource is available for a current thread from the thread handling circuitry 10. If the resource is not available, then at step 102 the resource checking circuitry 12 issues a resource request for the resource (if the resource has not already been requested). Provided that there is at least one cache line that has not been locked in the cache 8, then an unlocked cache line is reallocated for storing the requested resource, and a linefill request is issued to memory 6 to request that the required data is fetched from memory 6 and is stored in the allocated cache line 8. If the allocated cache line already contains data than that data can be evicted.

At step 104, the resource checking circuitry 12 sends the current thread to the replay buffer 30 or to the start of the pipeline 20. Generally, if pre-processing performed by the pipeline 20 is complete than the thread would be sent to the replay buffer 30, although the thread may be looped back to the start of the pipeline 20 by the router 24 if there is no space in the replay buffer 30 or some further pre-processing is required for the thread.

At step 106, the resource checking circuitry 12 checks whether a lock has already been set for the required resource. If not, then at step 108 a lock is set for the requested resource. The lock owning thread is set to the current thread at step 110.

On the other hand, if the lock has already been set, then following step 106 the method proceeds to 109 where the resource checking circuitry 12 determines whether the current thread is the lock owning thread. If the current thread is not the lock owning thread, then again at step 110 the current thread is set as the lock owning thread.

At step 112, the resource checking circuitry 12 checks whether resources are available for the next thread, and the method returns to step 100.

Eventually, the resource checking circuitry 12 will determine that the required resources are available for a current thread, and the method then, proceeds from step 100 to step 120, where the current thread is forwarded to the processor 4 for processing. The processing circuitry 4 processes the thread using the acquired resources.

At step 122, the resource checking circuitry 12 checks whether a lock has been set for the resource required by that thread and the current thread is the lock owning thread for the locked resource. If both of these conditions are true than at step 124 the lock is removed so that the resource can be reallocated for use by other threads.

On the other hand, if no lock has been set for the required resource, or a lock has been set but the current thread is not the lock owning thread, than no action is taken and the method proceeds directly from step 122 to step 112 where the resource checking circuitry 12 checks at the next thread. Therefore, the lock is not removed when a thread other than the lock owning thread exits the thread handling circuitry 10 for processing.

While FIG. 5 shows steps 100 to 124 being performed in a certain order, it will be appreciated that this is merely an example, and that at least some of these steps may be performed in a different order or in parallel.

In summary, by using the present technique a lock can be used more efficiently than in the case where locks are reserved for use by a single thread only. This eliminates the need for multiple threads accessing the same resource to each request a lock and so enables more efficient use of the resources available.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
processing circuitry configured to process operations of pending threads using resources accessible to said processing circuitry;
thread handling circuitry configured to handle pending threads awaiting resources required for processing, wherein said thread handling circuitry comprises a thread buffer configured to buffer pending threads for which at least one resource is not available; and
resource checking circuitry configured to check whether at least one resource required by a requesting pending thread from said thread handling circuitry is available, to forward said requesting pending thread to said processing circuitry for processing if said at least one resource is available, and if said at least one resource is not available, to request a lock to said at least one resource and to retain said requesting pending thread in said thread buffer of the thread handling circuitry, wherein the checking on the availability of a resource is performed upon being requested by a pending thread; wherein:
said resource checking circuitry, responsive to determining that the resource is both unavailable and not already locked, is configured to set a lock for an unavailable resource, make the requesting pending thread a lock owning thread, and add the requesting pending thread to the thread buffer of the thread handling circuitry, wherein a locked resource which becomes available remains available until the lock associated with the current lock owning thread of the locked resource is removed;
said resource checking circuitry is configured to on determining that a locked resource is unavailable for a subsequent pending thread which requires said locked resource and is not the current lock owning thread for said locked resource, set said subsequent pending thread as the lock owning thread for said locked resource, and add the subsequent pending thread to the thread buffer of the thread handling circuitry; and
said resource checking circuitry, upon the availability of the resource, is configured to send at least one pending thread in the thread buffer to the processing circuitry for processing using the available resource, determine whether the processed pending thread is the current lock owning thread, and if so remove the lock associated with an available locked resource.

2. The data processing apparatus according to claim 1, wherein said resource checking circuitry is configured to retain the lock associated with said available locked resource if a pending thread which requires the available locked resource and which is not the current lock owning thread is forwarded to said processing circuitry for processing.

3. The data processing apparatus according to claim 1, wherein said locked resource is associated with a lock identifier identifying the current lock owning thread for said locked resource, and said resource checking circuitry is configured to set said subsequent pending thread as the lock owning thread by updating said lock identifier of said locked resource.

4. The data processing apparatus according to claim 3, wherein each pending thread is associated with a thread identifier, and said lock identifier comprises the thread identifier of the current lock owning thread.

5. The data processing apparatus according to claim 1, wherein said resource checking circuitry is configured to prevent said available locked resource becoming unavailable until the lock associated with said available locked resource has been removed.

6. The data processing apparatus according to claim 1, wherein said thread handling circuitry comprises a pipeline configured to perform pre-processing operations on said pending threads.

7. The data processing apparatus according to claim 6, wherein said pre-processing operations include determining which resources are required for said pending threads.

8. The data processing apparatus according to claim 6, wherein said resource checking circuitry is configured to check whether said at least one resource is available for a pending thread output from the pipeline, and if said at least one resource is not available, to return the pending thread to the start of the pipeline.

9. The data processing apparatus according to claim 1, wherein said thread handling circuitry comprises a thread buffer configured to buffer pending threads for which at least one resource is not yet available.

10. The data processing apparatus according to claim 9, wherein said thread buffer comprises a "first-in first-out" (FIFO) buffer, and said resource checking circuitry is configured to check whether said at least one resource has become available for a pending thread output from said FIFO buffer, and if said at least one resource is not available, to input said pending thread to said FIFO buffer.

11. The data processing apparatus according to claim 1, wherein said resources comprise data required for processing said pending threads.

12. The data processing apparatus according to claim 11, comprising a memory configured to store said data and a cache configured to cache a portion of said data stored in said memory, said cache comprising a plurality of cache storage locations.

13. The data processing apparatus according to claim 12, wherein said lock indicates that a cache storage location which has been allocated for storing data cannot be reallocated for storing other data until said lock has been removed.

14. The data processing apparatus according to claim 12, wherein said resource checking circuitry is configured to determine whether data required by a pending thread is present in said cache, and if not, to issue a request to fetch the required data from said memory, store said required data to a cache storage location of said cache, and set a lock for said cache storage location.

15. The data processing apparatus according to claim 14, wherein if all cache storage locations of said cache are already allocated for storing data, then said resource checking circuitry is configured to reallocate a cache storage location for which no lock has been set for storing said required data.

16. The data processing apparatus according to claim 14, wherein if a lock has already been set for all cache storage locations of said cache, then said resource checking circuitry is configured to retain said pending thread in said thread handling circuitry without issuing said request to fetch the required data from said memory.

17. The data processing apparatus according to claim 1, wherein said processing circuitry comprises a graphics processor.

18. The data processing apparatus according to claim 17, wherein said resources include texture data and said processing threads comprise texture mapping threads for controlling said graphics processor to perform texture mapping operations using said texture data.

19. A data processing apparatus comprising:
processing means for processing operations of pending threads using resources accessible to said processing means;
thread handling means for handling pending threads awaiting resources required for processing, wherein said thread handling means comprises a thread buffer means for buffering pending threads for which at least one resource is not yet available; and
resource checking means for checking whether at least one resource required by a requesting pending thread from said thread handling means is available, for forwarding said requesting pending thread to said processing means for processing if said at least one resource is available, and if said at least one resource is not available, for requesting a lock to said at least one resource and retaining said requesting pending thread in said thread buffer means of said thread handling means, wherein the checking on the availability of a resource is performed upon being requested by a pending thread; wherein:
said resource checking means, responsive to determining that the resource is both unavailable and not already locked, is configured to set a lock for an unavailable resource, make the requesting pending thread a lock owning thread, and add the requesting pending thread to said thread buffer means of the thread handling means, wherein a locked resource which becomes available remains available until the lock associated with the current lock owning thread of the locked resource is removed;
said resource checking means, on determining that a locked resource is unavailable for a subsequent pending thread which requires said locked resource and is not the current lock owning thread for said locked resource, is configured to set said subsequent pending thread as the current lock owning thread for said locked resource and add the subsequent pending thread to the thread buffer means of the thread handling means; and
said resource checking means, upon the availability of the resource, is configured to send at least one thread in the thread buffer means to the processing means for processing using the available resource, determine whether the processed pending thread is the current lock owning thread, and if so remove the lock associated with an available locked resource.

20. A method of processing data using a data processing apparatus comprising processing circuitry configured to process operations of pending threads using resources accessible to said processing circuitry, and thread handling circuitry configured to handle pending threads awaiting resources required for processing, wherein said thread handling circuitry comprises a thread buffer configured to buffer pending threads for which at least one resource is not yet available;
said method comprising steps of:
(a) checking whether at least one resource required by a requesting pending thread from said thread handling circuitry is available;
(b) if said at least one resource is available, then forwarding said requesting pending thread to said processing circuitry for processing using said at least one resource;
(c) if said at least one resource is not available, then:
(i) determining whether a lock was given for the at least one resource
(ii) if the lock was not given, requesting a lock to said at least one resource for said requesting pending thread and retaining said requesting pending thread in said thread buffer of said thread handling circuitry, wherein the checking of the availability of a resource is performed upon being requested by a pending thread; and (iii) if the resource is already locked, setting the requesting pending thread for which said at least one resource is requested as a lock owning thread for said at least one resource, and adding the requesting pending thread to the thread buffer of the thread handling circuitry;

(d) checking whether a locked resource required by a subsequent pending thread from said thread handling circuitry is available, wherein a locked resource which becomes available remains available until the lock associated with the current lock owning thread of the locked resource is removed;

(e) if said locked resource is unavailable for the subsequent pending thread and said subsequent pending thread is not the current lock owning thread for said locked resource, setting said subsequent pending thread as the lock owning thread for said locked resource and adding the subsequent pending thread to the thread buffer of the thread handling circuitry; and (f) upon the availability of the resource, sending at least one pending thread in the thread buffer to the processing circuitry for processing using the available resource, determining whether the processed pending thread is the current lock owning thread, and if so removing the lock associated with an available locked resource.

* * * * *